May 11, 1943.  L. H. DE WYK, JR  2,319,042
VULCANIZING RUNNING LENGTH OF COMPOSITE
RUBBER STRIP AND APPARATUS THEREFOR
Filed Oct. 18, 1940   4 Sheets-Sheet 1

Fig. 1
Fig. 2

INVENTOR
Rudolf H. De Wyk, Jr.
BY
ATTORNEY

Patented May 11, 1943

2,319,042

UNITED STATES PATENT OFFICE

2,319,042

VULCANIZING RUNNING LENGTH OF COMPOSITE RUBBER STRIP AND APPARATUS THEREFOR

Ludolf H. De Wyk, Jr., Ansonia, Conn., assignor to The Sponge Rubber Products Company, Shelton, Conn., a corporation of Connecticut Application October 18, 1940, Serial No. 361,662

21 Claims. (Cl. 18—6)

This invention relates to processes, methods and apparatus for producing a composite vulcanized rubber product of single or multiple elongated strip-like nature and unlimited length which may consist of a uniformly vulcanized body or core of cellular or sponge rubber wholly or partially sheathed within and bonded to a uniformly vulcanized outer covering skin of solid or non-porous rubber.

United States Patent No. 2,200,262, granted May 14, 1940, explains the practical impossibility of producing uniform vulcanization of a sponge rubber strip of unlimited length by intermittently subjecting sections of its length to successive applications of vulcanizing heat in a stationary mold, while adjoining sections of its length are not subjected simultaneously to an equal application of vulcanizing heat. In that patent a method is disclosed and claimed which is capable of predetermining definitely the cross sectional shape and of predetermining fully the exterior surface contour of sponge rubber strips while vulcanizing them uniformly throughout an unlimited length. The method referred to also effectively solves serious problems which arise in attempting to feed automatically and continually into constantly traveling mold cavities or chambers a weak soft plastic-like substance such as sponge rubber compound or similar unvulcanized compositions containing rubber or synthetic rubber which are deficient in toughness and tensile strength.

The present improvements involve combinations of steps, as well as combinations of apparatus useful but not in all cases essential to the performance of said steps, for preparing transporting and delivering vulcanizable materials such as unvulcanized rubber stock and compounds, of respectively different kinds, to the same constantly traveling mold section and preferably as a continuous process. These steps may involve not only an extrusion process explained in the aforesaid U. S. Patent No. 2,200,262 and also in a copending application divisional therefrom, Serial No. 333,974 filed May 8, 1940, now Patent No. 2,315,366 but also involve in conjunction therewith a calendering process explained in the said patents and further explained in another copending application, Serial No. 158,468, filed August 11, 1937, now Patent No. 2,218,527.

One object of the invention herein claimed is to predetermine and to protect from accidental distortion a desired irregular cross-sectional shape of a continually generated and continually fed strip of sponge rubber compound while preventing such strip from accidentally overturning or diverting from proper disposition and path of travel while advancing on its way to a traveling mold cavity of corresponding irregular cross-sectional shape. In the case of a cross sectional mold shape whose lengthwise extension forms a pocket-like groove so disposed that a corresponding ridge-like bead on and lengthwise of the traveling strip of compound would find it difficult to enter and fill such groove during the process of "blowing" or expanding (which precedes final vulcanization of an expansible compound) the bead must ride into occupational relationship to the groove as the strip is progressively delivered onto the traveling mold section.

A further object of the invention is to prepare and deliver to cavities in lower or underlying traveling mold sections, which are later to be roofed over as they travel for completing the enclosure of a traveling mold chamber, a strip of compound so shaped in cross section and so positioned in relation to such chamber that a minimum amount of "flow" or displacement of its bulk is required in order to reach and fill all parts of the irregularly shaped mold chamber when the compound expands therein.

A further object is to introduce, along with such strip of sponge rubber compound, a skin material in thin sheet form composed of non-blowable unvulcanized rubber, and more particularly a skin material in the form of a wide thin sheet or web underlying and traveling in unison with a plurality of strips of sponge rubber compound, all simultaneously generated and advancing lengthwise side by side.

A further object is to introduce into the traveling mold chambers along with the sponge rubber strips a similar skin material overlying and traveling in unison with a plurality of the simultaneously generated and side-by-side traveling strips of sponge rubber compound.

A further object is to introduce progressively into the traveling mold cavities along with the plural strips of sponge rubber compound both an underlying sheet and an overlying sheet of the said non expansible or solid unvulcanized rubber, and in a manner to cause both of said overlying and underlying sheets or webs to unite along lines which extend in the direction of web travel and which lie respectively between the side-by-side traveling strips of sponge rubber compound. This forms a completely enveloping exterior sheath or skin around each of the side-by-side sponge rubber strips however irregular may be their individual cross sectional shapes.

A further object is to prevent stretching or wrinkling of the said sheets or webs as a result of the necessary initial looseness and considerable width of the described upper and/or lower thin skin-forming materials. Wrinkling must be prevented both at the point of intake into the traveling mold chambers and while the sheet material is being progressively pressed into conformity with the irregular contours of the walls of the mold chambers by the expansion of the strips of sponge rubber compound which become wrapped within the sheet material of said webs just preceding vulcanization.

Still another object is to support, guide and convey a large number of irregularly shaped strips of compound while they are closely positioned side by side all the way from the extrusion orifices at which they are generated to their point of delivery to the mold cavities, and to convey such strips in proper relation to the upper and/or lower traveling webs of the skin forming material and in proper relation to be received therewith into the traveling mold cavities.

Another and important object is to protect the continually indrawn sponge rubber core material and the solid rubber skin materials from being pinched or ruptured by the action of an articulated endless chain of upper mold sections as such sections progressively swing down and bite together in joining an underlying traveling train of mold sections.

The foregoing and related objects are achieved by methods and processes which may, or may not utilize a particular apparatus explained in the following description having reference to the accompanying drawings wherein.

The continuous strips and webs of the differing materials upon which are practiced the methods and processes of this invention originate at co-related strip and web generating stations. In the herein shown example of the present improved methods and processes, the traveling unvulcanized strips are composed of sponge rubber compound and the traveling unvulcanized webs are thin, wide, ribbon-like sheets of vulcanizable rubber free from "blowing" agents that would cause it to expand when being vulcanized. A given cross sectional size of the material of these webs is therefore tougher and stronger than would be the same cross sectional size of the sponge rubber compound of the strips.

While the present improved methods and processes contemplate a variety of means or apparatus by which the described strips and webs may be generated, conveyed and delivered to a processing or vulcanizing machine simultaneously and at equal speeds of linear travel, there is shown herein for purposes of illustration certain apparatuses whose details are more fully disclosed in other patents and copending applications which are herein elsewhere referred to. In such apparatus as is shown scantily herein, a suitable web generating calender 9 may include a frame 10 which supports bearings for an upper set 11 of calender rolls and a lower set 12 of similar calender rolls, which sets of rolls generate, respectively, the upper traveling web 13 and the lower traveling web 14. One of these two sets of rolls is vertically spaced above the other set so as to cause the upper and lower webs to leave the calendering machine 9 simultaneously in vertically separated relationship. This permits the continuous traveling strips 17 of sponge rubber compound, which originate at an extruding station spaced to the right of the calendering machine in Fig. 1, to approach the calendering station and pass freely between the upper and lower sets 11 and 12 of calender rolls and thus come to ride away from the calendering machine toward the left in Fig. 2 supported upon the lower traveling web. At this point strips 17 are spaced below and free from contact with the upper traveling web 13. Both sets of rolls 11, 12 are rotated at such speed by power transmitted thereto in part by a large slowly moving gear 68 that a like linear speed of travel is imparted to both webs 13 and 14. These webs constitute respectively the calendered forms of supply bulks 15 and 16 of unvulcanized rubber which as before stated is free from gas generating agents that would cause it to "blow" or expand in the vulcanizing process.

Figures 16, 17, 18:
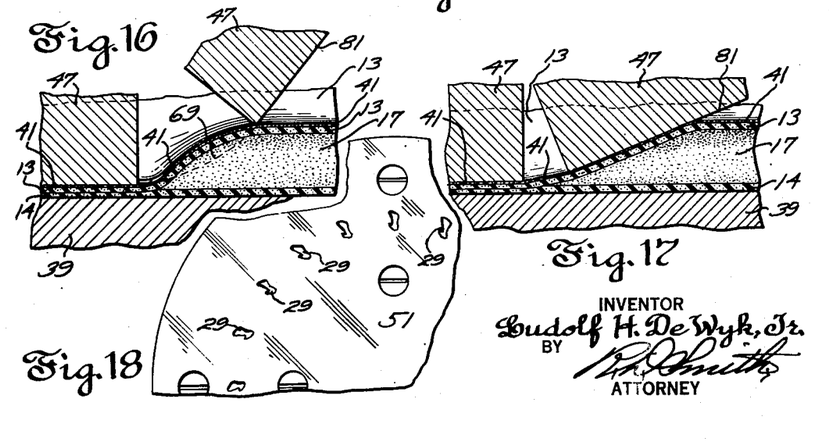
Fig. 16 is a fragmentary sectional view taken on the plane 16—16 in Fig. 10 drawn on a still larger scale looking in the direction of the arrows showing the danger of pinching of the fed-in materials by the biting corners of the upper mold sections.
Fig. 17 is a corresponding view taken in section on plane 17—17 in Fig. 11 showing the corners of the upper mold sections swung into closer proximity without pinching the work.
Fig. 18 is a fragmentary view of one quadrant of the face of the extruding die looking in the direction of the arrows from plane 18—18 in Fig. 14.

The strips 17 of sponge rubber compound originate simultaneously in longitudinally traveling form at the head 18 of an extruding machine whose hollow body 19 is supplied constantly, or as often as necessary, with replenishing charges or slugs 20 of the sponge rubber compound which may be arranged end-to-end to slide down an inclined chute 49 into the extruder. At a dusting station or compartment 25 in extrusion head 18, a lubricative powder is applied manually or automatically to all exterior surfaces of all of the strips 17 just as they issue from their forming orifices 29 in head 18. After passing out of the dusting compartment through oversize guide apertures in its face wall 24, the dusted strips sag downward whereby they present enough loose length to permit handling and inspection by an attendant before they pass on to the upwardly inclined endless conveyor belt 26. The attendant is given ample time and opportunity to assist the strips in arranging themselves in side-by-side spaced relationship as they pass between stationary separator pins 58 spaced apart in a transversely extending row and advance toward conveyor 26. At the same time the attendant can manually, as with a brush, complete or perfect the dusting of the passing strips if desirable, whereupon belt 26 carries away the lubricated strips of compound, which ride lengthwise on this belt and side-by-side. Thus conveyed by belt 26, the strips 17 reach a point on a level with the lower web 13 and spaced below the upper web 14 of the skin forming unvulcanized rubber as these two webs are simultaneously leaving the calender 9. Here strips 17 are played off from conveyor belt 26 and received onto the top surface of the traveling lower web 14. The linear speed of travel of strips 17 is like the linear speed of travel of webs 13 and 14 and is so maintained by imparting rotary speed from a source of power, (not shown) to one of the conveyor pulleys 27 or 27' which impel belt 26. Proper rotary speed is also imparted from a source, not shown, to gear wheels such as 28 which transmit power to an extruding screw 21 or other suitable mechanism within the extruder body 19 which acts to force the sponge rubber compound out from the extruder through the aforesaid extrusion orifices 29 and dusting compartment guide apertures in the head 18. Thus there is simultaneously generated plural strips 17 as shown, or any much larger number of strips depending on the number of orifices. Where many orifices are involved it is considered best to dispose them in a circular series as shown in Fig. 18.

Figure 1:
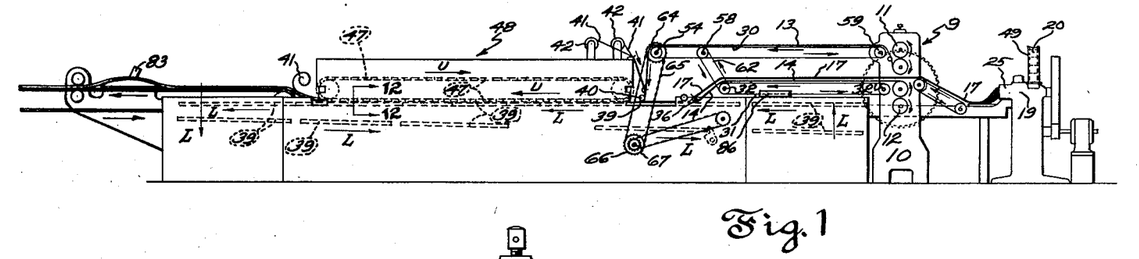
Fig. 1 represents in side view the full length of a multiple continuous strip vulcanizing machine associated end-to-end with strip and web generating and feeding apparatus usable in practicing the improved methods and processes of the present invention.
Figure 2:
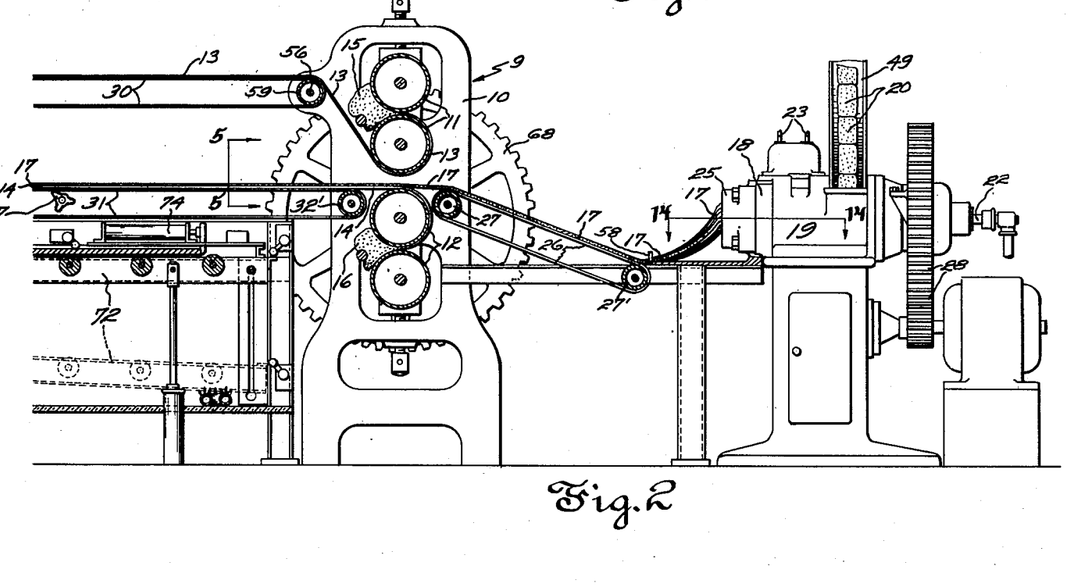
Fig. 2 reproduces on an enlarged scale the right end portion of Fig. 1 showing fuller details of the apparatus which generates the strips and the webs.
Figure 5:
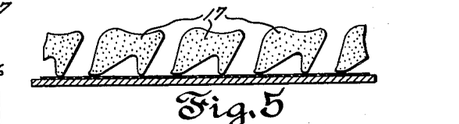
Fig. 5 is an enlarged sectional view taken through several of the constantly advancing strips of unvulcanized sponge rubber compound at the stage in the process indicated by section plane 5—5 in Fig. 2 looking in the direction of the arrows.

At the left of the calendering machine 9 in Fig. 1 there are two endless traveling conveyor belts 30 and 31. Onto the upper belt 30 is progressively pulled the upper traveling web 13 after the latter has clingingly traveled around on the periphery of the lower or clockwise rotating roll, of the upper set 11, while the lower web 14 is played off onto the lower belt 31 after it has clingingly traveled around on the periphery of the counterclockwise rotating top roll of the lower set 12. Web 14 carries with it at this point the strips 17 of compound which are riding side by side thereon as shown in Fig. 5.

Farther along at a combing station, the strips 17 of compound depart temporarily from web 14 and pass over a crosswise disposed comb bar 36 and between spaced separating pins 37 upstanding therefrom at about the point where web 14 is being played off from its lower conveyor belt 31. But at this same combing station the lower web 14, which up to this point has been supporting the strips 17, is permitted to sag and thereby pass under the comb bar 36 and is thereby played directly downward into contact with the upper surface of a traveling lower mold plate which is about to enter the processing or vulcanizing machine. Beyond this combing station the mold section supported traveling lower web 14 is rejoined by the traveling strips 17 which in passing between comb pins 37 have become straightened out and evenly spaced for registering lengthwise and respectively with continuous strip receiving mold cavities 38 in the traveling mold plate 39, although separated therefrom by the intervening web 14. This step in the process is better illustrated in Figs. 6 and 15, and further explained hereinafter.

At a station further along in the process, the upper traveling web 13 is played downward off from the upper conveyor belt 30, on which belt up to this point it has been riding at a relatively high level, and is received against the lobed peripheral surface of a presser roller 40 and passes a quarter way round and under the latter being thus pressed somewhat against the tops of the traveling strips 17 as the latter and their underlying lower web 14 ride together toward the left and pass under roller 40 in Fig. 1 supported upon the cavity grooved top surfaces of lower traveling mold sections 29. This traveling joindure of the upper web 13 with strips 17 takes place at 8—8 in Fig. 3, as illustrated on a large scale in Fig. 4 and further described hereinafter.

Figures 3, 4, 19:
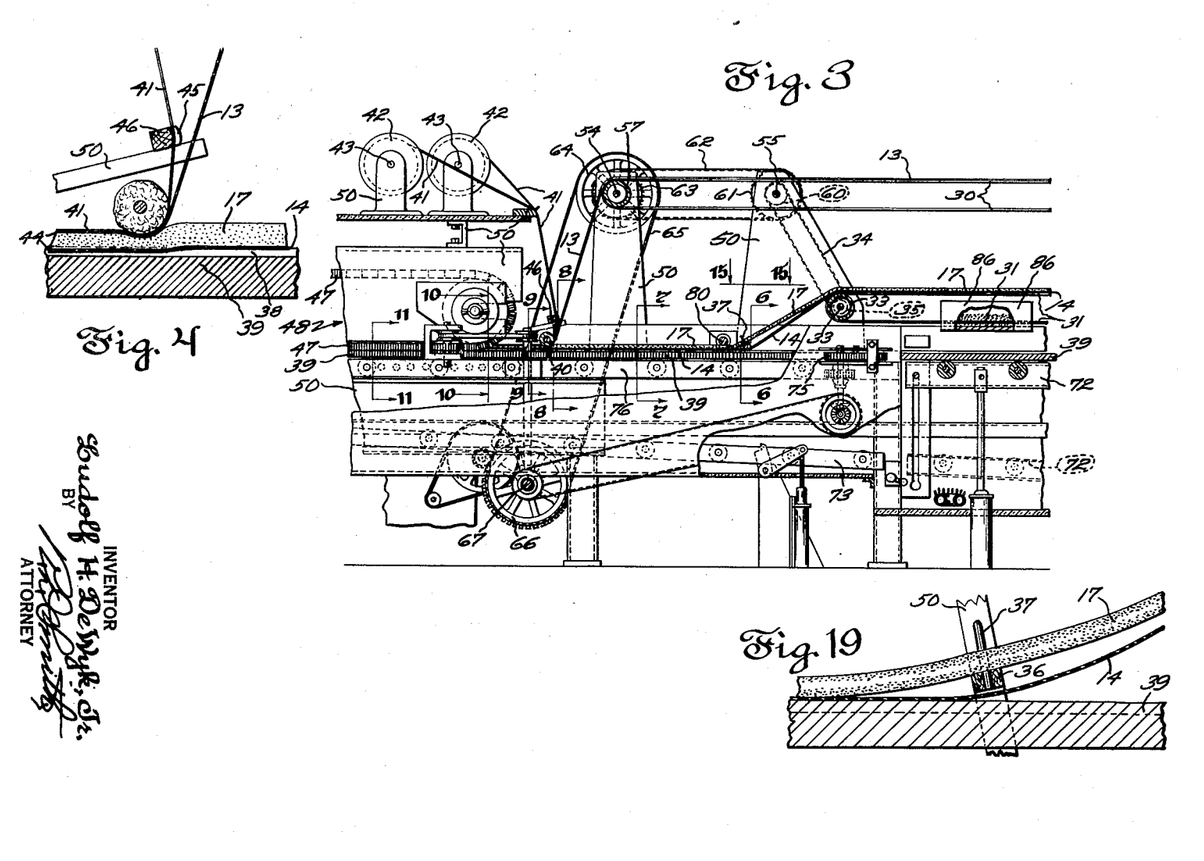
Fig. 3 reproduces on a scale corresponding to Fig. 2 a central portion of Fig. 1 showing fuller details of the work receiving end of the vulcanizing machine and the cooperative apparatus which feeds combined strips and web thereto.
Fig. 4 is an enlarged fragmentary detail of a portion of Fig. 3 at the process station indicated by 9—9.
Fig. 19 is an enlarged fragmentary detail of a portion of Fig. 3 showing certain parts in section at the combing station indicated by 6—6.

Ahead of roller 40 in the line of travel of the rubber webs and strips there is received between roller 40 and the upper web 13 a series of laterally spaced continuous ribbons 41 of Cellophane or other tough, thin, flexible, slippery, heat resistive material. The spacing of these ribbons is determined by intervening guide projecting partitions 45 which separate guide notches cut in a cross bar 46 fixed crosswise on the machine frame. Ribbons 41 are drawn off from their respective separate spools such as 42, only two of which are shown in Fig. 3, and which are rotatably mounted on frame carried stud shafts 43. Light friction constantly opposes the turning of these spools to keep the Cellophane ribbons yieldingly taut.

Figure 9:
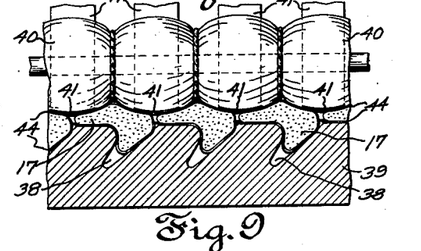
Fig. 9 similarly shows both the advancing webs and strips at stage 9—9 in Fig. 3 after they have passed under a special form of squeezing roller.

After all of these traveling continuous lengths of materials, including the strips 17, webs 13 and 14 and the Cellophane ribbons 41, have passed in unison under roller 40, as shown in Fig. 9, they come to the point 18—18 in Fig. 3 where the upper traveling mold sections 47 swing downward and join the lower traveling mold sections 39 in a manner to roof over or complete the closeting of traveling mold chambers into which said strips, webs and ribbons pass in unison. Thus imprisoned between upper and lower mold sections these materials are carried therewith through a zone of vulcanizing heat provided within the vulcanizing machine which is indicated as a whole by 48. Upon emerging from the vulcanizing machine the unvulcanizable Cellophane ribbons are easily and progressively stripped off or separated from the now vulcanized rubber skin 44, having served their purpose of protecting the soft unvulcanized rubber materials from being pinched, stretched or torn by the biting corners or edges of the upper mold sections 47 during the movement of the latter from their relation in Fig. 16 to their relation in Fig. 17 as hereinafter more fully explained.

Whereas the general nature of the steps going to make up the present improvements in method and processing has been outlined in the foregoing, in actual practice particular problems and difficulties are encountered and have required solution for utilizing the described steps for their intended purpose. These problems arise in part from the difficulty which is inherent in establishing and maintaining properly accurate positioning of weak, soft, tacky strips of sponge rubber compound while very long stretches of the same are continually traveling together, and from the difficulty which is inherent in maintaining without distortion the original cross sectional shapes imparted to such strips at their extrusion orifices. While the skin-forming rubber material of the upper and lower webs 13 and 14 is tougher and more tenacious than that of the core strips 17 before vulcanization, the extreme thinness of these webs produces a strong tendency to wrinkle. This has been overcome in the present improvements even to an extent permitting simultaneous production of as many as twenty strips traveling side-by-side in unison while sandwiched between skin-forming webs which must be of very considerable width to overlie and underlie so large a quantity of core strips. Examples of methods which have successfully been resorted to for overcoming some of these difficulties may best be understood from a fuller consideration of the apparatus and performance of materials illustrated or diagrammed in the drawings.

For best results, the extruding machine 19 incorporates provision for cooling to selective degrees the faces of the extruding screw 21 which work against the sponge rubber compound and preferably by means of cold water reaching the hub portion of such screw through a valve controlled pipe such as 22. The chamber within body 19, in which the bulk supply of sponge rubber compound is amassed, preferably is jacketed at 170. Such jacket sections may be heated by steam or cooled by water selectively passed through pipes such as 23 as best suits the temperature and the characteristics of the compound being worked with. By such means a proper size and consistency of many simultaneously extruded strips of sponge rubber compound is achieved. The extruding head 18 whose die 51 is provided with the circular series of orifices 29 contains a centrally disposed cone-shaped deflector 52 which leads the screw impelled compound into an annular or ring-like space registering with the circular series of extrusion orifices. Back of this cone deflector the compound is caused to travel through stationary apertures 53 distributed over the area of a partition wall 79 which breaks up the churning action that otherwise would be imparted to the plastic mass of compound by the rotary action of the extruding screw. This treatment of the material in the extruding machine results in producing many neighboring endless strips 17 of sponge rubber compound from the same extrusion chamber simultaneously, all of uniform density and of full sized accurate cross sectional shape. The preferred disposition of the die orifices on the circle is indicated in Fig. 18.

As these strips pass through the dusting chamber 25, finely powdered lubricant which is capable of dissipating under vulcanizing heat, such as zinc stearate, is blown violently against them from all directions, their exterior surfaces becoming completely covered therewith. The powdered lubricant may be applied by hand as with a brush and in that case the chamber 25 with its wall 25 may be omitted. The zinc stearate or other lubricant applied to strips 17, because of its ability to dissipate or become absorbed into the substance of the rubber materials which are being vulcanized, does nothing to impair the strength and perfection of the bonding of strips 17 to their covering skin as hereinafter described. For replenishing the bulk supply of sponge rubber compound within the extruder body 19, an inclined chute 49 feeds through an opening 77 into the top of the extruder body. Down this chute, end-to-end slugs 20 of the sponge rubber compound may slide or be pushed as needed for replenishing the contents of the extruder.

With further reference to the processing station where the skin forming webs 13 and 14 are calendered and sent upon their journey to accompany the traveling strips of sponge compound, a mere duplication of the single sheet of calender rolls whose construction is more fully represented in the aforesaid Patent No. 2,218,527 will suffice to generate simultaneously and in vertically separated relationship the upper and lower webs 13 and 14 whose thickness will be determined by the independently variable spacing of the two rolls in each of the sets 11 and 12, while the width of each traveling web may be rendered uniform and of any selected dimension by the usual form of cutting or edge trimming knives bearing against the surface of one of the rolls as disclosed in the last said patent, which knives need not herein be shown.

Figure 15:
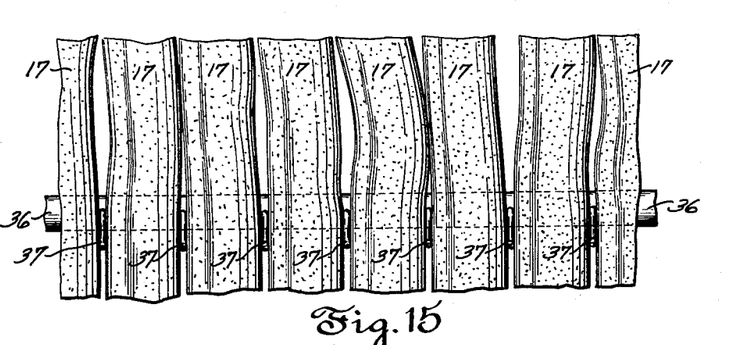
Fig. 15 is a fragmentary plan view looking downward on Fig. 6 showing the straightening of the advancing strips as they pass between comb teeth.

The side-by-side strips 17 of sponge rubber compound ride along supported upon the lower traveling web 14 of skin-forming, unvulcanized solid rubber as the said strips and web are thus conveyed in unison toward the left by the endless belt 31 in Fig. 1, it being noted in Fig. 15, that irregular spacing of the not necessarily straight strips may be present at this point in their travel. If it is not desired that strips 17 shall ride in contact with lower web 14 at the stage of their travel represented in Fig. 5, an additional conveyor belt may be interposed between the upper belt 30 and the lower belt 31 for the sole purpose of supporting and conveying the strips 17 at a higher level than web 14 and separated therefrom. But it is a convenience and permits simplification of the apparatus to use the lower web 14 as a supporting conveyor for the strips 17 from the calender 9 to the left end of belt 31 which is supported by the elongated power pulley 32.

The right end of belt 31 is supported by an idler roller or pulley 32'. Power to rotate pulley 32 is transmitted to its shaft 33 by means of a drive chain 34 and sprocket wheel 35 fixed on shaft 33. The latter shaft, as well as the shaft of pulley 32', is given suitable bearings in the frame work of the apparatus indicated at various points as 50.

This same frame work also supports additional bearings at a higher and common level for three shafts 54, 55 and 56 which carry respectively the elongated pulley 57 and the support rollers 58 and 59. All of these cooperate in the support of an endless conveyor belt 30 which is impelled by pulley 57. Shaft 55 carries a sprocket wheel 60 engaged by and serving to drive chain 34. Shaft 55 further carries another sprocket wheel 61 fixed to rotate in unison with sprocket wheel 60 and driven by a chain 62 which is impelled by a sprocket wheel 63 fast on shaft 54. Shaft 54 further carries fixed thereon the sprocket wheel 64 which by means of chain 65 is driven from a power sprocket wheel 66 on the power shaft 67 of the vulcanizing machine 48.

In Figs. 1 and 3 is represented a dusting box 86 through which the lower reach of conveyor belt 31 passes. Since this box contains powdered mica or a like powdered form of lubricant which is permanent non dissipative and immune to heat and the belt 31 is constantly passing through this mica dust, the surfaces of belt 31 becomes progressively coated therewith so that in riding along upon belt 31, the lower web 14 of skin-forming unvulcanized rubber picks up and becomes dusted with this powdered mica. A more even and thorough coating of the mica will be transferred to web 14 from belt 31 if the latter is vibrated or beat upwardly while web 14 rests thereon as by a power driven rotary agitator 87. Thus only the lower surface of the lower web 14 becomes coated with the powdered mica, soapstone or other permanent lubricant which will insure the web creeping freely along the hot mold surfaces as the web is stretched into full conformity with the mold cavity by "blowing" of the core of sponge rubber compound without adhering in spots which might result in pitting on the exterior surface of the vulcanized product. The upper surface of upper web 13 should be dusted with similar substance for a similar purpose as it advances while riding upon the conveyor belt 30.

Further particulars of the manner in which power shaft 67 operates the vulcanizing machine will be clear from reference to the aforesaid copending applications, Serial Nos. 279,701 and 158,468, now Patent Nos. 2,292,366 and 2,218,527, respectively, it sufficing here to state that under power transmitted through shaft 67 the lower mold sections 39 in unison with the upper mold sections 47 travel in endless procession through a zone of vulcanizing heat within the vulcanizing machine 48. In so doing, they are supported and guided by mechanisms disclosed in greater detail in a copending application, Serial No. 111,769, now Patent No. 2,288,611.

In all of the aforesaid copending applications, the lower mold sections of the vulcanizing machine form an exposed traveling platform in which these lower mold sections closely abut end-to-end as they travel toward the heat zone of the vulcanizing machine. This traveling platform leads to the point where the lower mold sections are joined by the upper traveling mold sections. A manner in which this traveling platform may be composed of very long and very wide rigid plate-like mold sections is fully set forth in the aforesaid U. S. Patent No. 2,292,366. Main parts of the apparatus are herein represented in Figs. 1 and 2, and will require no detailed description here other than to explain that these large plate-like lower mold sections 39 become successively returned to an automatic elevator 72 one by one, as they are transferred from the work discharging end of the vulcanizing machine, by another elevator 71 onto an inclined roller trackway 73. After coasting down this trackway onto the elevator 72, the latter lifts each mold section in turn to the level of the traveling platform before referred to. The circuitous travel of lower and upper mold sections is indicated respectively by arrows L and U in Fig. 1. Elevator 72 carries a pneumatically operated pusher 74 which automatically initiates the departure of the mold section off from the elevator and toward the left in Fig. 2 and thereby delivers the mold section to the impelling drive of feed-up gears 75 which act on the rack-toothed edges of the mold section to thrust the leading end of the latter into abutting contact with the trailing end of the mold section which is preceding it and approaching the vulcanizing machine. Thus for all practical purposes, a crackless and continually traveling platform composed of successive abutting mold sections is constantly progressing toward the vulcanizing machine along the roller bed 76. Onto this traveling platform the strips 17 and their underlying web 14 are deposited as they are played off from the left end of conveyor belt 31. Chamfered collars on a rotating cross shaft 80 make certain that each mold plate 39 assumes accurate lateral alignment. The unvulcanized traveling strips 17 pass freely under this shaft.

Figure 6:
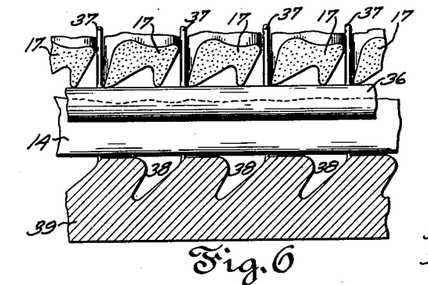
Fig. 6 is a similar sectional view at the stage in the process indicated by 6—6 in Fig. 3 showing the lower web delivered to the top surface of traveling lower mold sections and the strips passing through separating and straightening comb teeth.

Fig. 6 shows the before described comb pins 37 correcting the arbitrary, irregular spacing of strips 17 into uniform spacing so that these strips will be straight and exactly overlie the cavity grooves 38 in the lower mold sections 30 as they arrive in accurate register therewith. Fig. 19 further shows the lower web 14 passing under the comb bar 36 while the strips 17 ride over said bar and between the pins 37. In Fig. 6 the web 14 has drooped practically into contact with the upper surface of the lower mold sections and intervenes between the latter and the strips 17.

After thus being straightened and uniformly spaced by comb pins 37 the strips 17 are held from fully entering the lower mold section cavity grooves 38 only by the intervening web 14 which is seen to sag slightly into the mold cavity under the weight of its thus supported sponge rubber strip.

Figure 7:
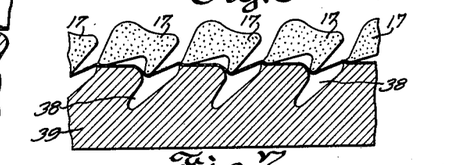
Fig. 7 similarly shows at stage 7—7 in Fig. 3 the restoration of the separated and straightened strips to traveling support by the lower web.

Fig. 7 shows but little change of the positional relationship of the strips and lower web, the latter possibly yielding somewhat more than in Fig. 6 as it becomes slightly softened by the heat of the mold section on which it rests, thus allowing the bead or ridge of the sponge rubber strip which overlies the mold cavity to sink a little further into the latter. It will be understood that the mold sections 39 in the exposed traveling platform remain hot from the effects of their former travel through the vulcanizing machine.

Figure 8:
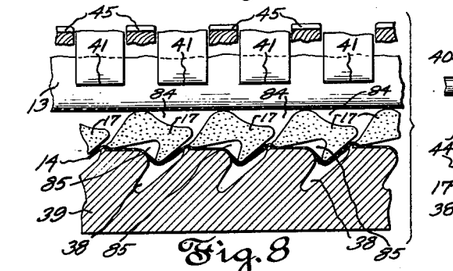
Fig. 8 similarly shows at stage 8—8 in Fig. 3 the traveling upper web and cellophane ribbons about to join the advancing strips.

Fig. 8 shows the upper skin-forming web 13 traveling down toward the sponge rubber strips after being played off from upper conveyor belt 30 and also shows just above this upper web continuous ribbons 41 of Cellophane which are about to be added to the materials which will pass together into the vulcanizing machine.

In Fig. 9 all of the materials shown in Fig. 8 have passed under the lobed surface of a freely rotatable presser roller 40 and have thereby been squeezed somewhat downward in a manner to force the beaded section of the sponge rubber strips more fully into the lower mold section cavities. This is permitted by a still further sagging and stretching of the lower web 14 but is so gentle as not to rupture the latter at any point. Also in Fig. 9 it will be observed that the upper web 13 has been forced into an undulating form of cross section such that it contacts or nearly contacts with the lower web 14 along continuous furrows separating the adjacent sponge rubber strips. Thus the upper web and lower web jointly have nearly been converted by progressively applied external pressure into a sheath or skin almost entirely encasing each sponge rubber strip 17 without tearing either of the upper and lower webs at any point.

Figure 10:
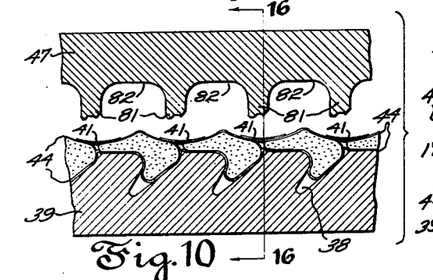
Fig. 10 similarly shows the webs with strips sandwiched therebetween still advancing in unison at the stage in the process indicated at 10—10 in Fig. 3 where the upper traveling mold sections close downward onto the lower traveling mold sections.

In Fig. 10 a further deformation of the cross sectional shape of each sponge rubber strip is seen to have resulted from the prolonged softening effect of the heat of the traveling lower mold on which all of the materials are riding. This deformation consists in a further sinking of the lower web 14 and its supported bead or ridge-like section of the sponge rubber strip 17 into the obliquely disposed mold cavity groove. Fig. 10 also shows one of the upper mold sections 47 swinging downward to join the lower traveling mold section.

Figure 11:
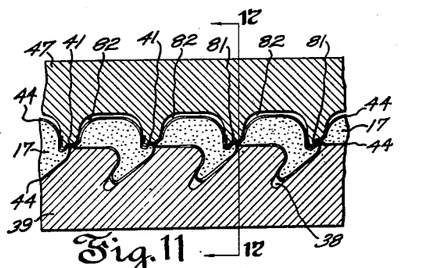
Fig. 11 similarly shows the upper traveling mold sections closed fully down in relation to the lower traveling mold sections at stage 11—11 in Fig. 3 thus closeting therebetween both the webs and the strips, which latter have started to "blow" or expand from the effects of heat.

In Fig. 11 the upper mold section has moved into its position to closet the mold chamber fully and in so doing each mold ridge 81 between adjacent cavities 82 acts to squeeze the upper web 13 into assured and firm contact with the lower web 14 along a continuous line separating each pair of the sponge rubber strips 17. These strips now become core bodies 17 completely covered by surface skin 44 composed of the conjoined unvulcanized solid rubber material of the upper and lower webs. In this squeezing together action of the upper and lower webs between the upper and lower mold sections the corners of the upper sections perform a biting action but are prevented from digging into and tearing the thin sheet-like material of either web by the tough, nonadhesive and antifrictional substance and surface character of the Cellophane ribbons 41. The upper web is in particular need of this protection or armoring by the Cellophane ribbons as is plain from Figs. 16 and 17 where the tendency of the upper skin to bulge into the angle gap and become bitten, pinched or torn by the leading corner of the descending upper mold section is represented. Upon encountering the tough slippery surface of the Cellophane, this corner of the mold section is enabled to displace the upper web out of its path by slipably wiping against the Cellophane ribbon without pinching or digging into it. The Cellophane ribbon itself is prevented from bowing upward into a position to become pinched between successive mold sections by the tension under which it is maintained by the hereinbefore mentioned friction opposing the play-off of ribbon 41 from spools 42.

Figures 12, 13:
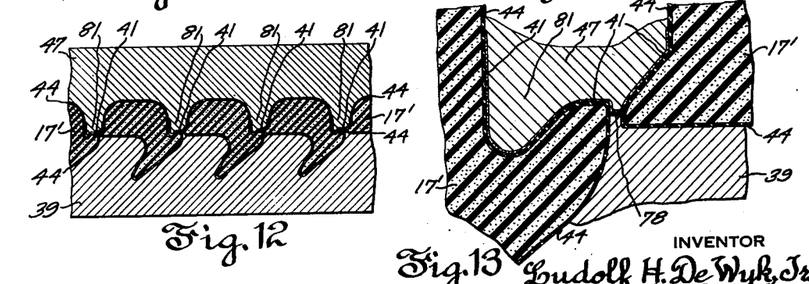
Fig. 12 shows the still traveling mold chambers completely filled by the fully expanded and now fully vulcanized skin-covered sponge rubber strips at the stage in the process indicated at 12—12 in Fig. 1.
Fig. 13 reproduces on a greatly enlarged scale the junction of the joined edges of two adjacent vulcanized strips in Fig. 12 and portions of upper and lower mold sections by which they are confined.
Figure 14:
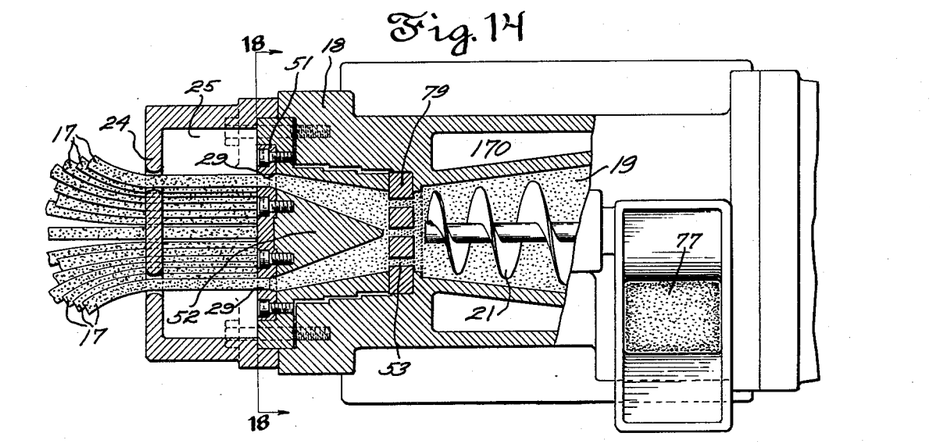
Fig. 14 is a plan view of the extruder drawn on an enlarged scale and taken partly in section on the plane 14—14 in Fig. 2.

In Fig. 12 the materials illustrated in Fig. 10 have traveled for a long enough time within the heat zone of the vulcanizing chamber to expand the completely ensheathed sponge rubber compound of the core strips 17 so that it forces the stretchable skin 44 of non-blowing sheet rubber stock into full and exact conformity with the interior surfaces of the mold chamber. Before this condition attains, however, there has continually existed throughout the length of the traveling molds as far backward in their travel as station 8—8 in Fig. 3, not only the spaces between skin forming webs 13, 14 and the mold surface indicated as 82 and 38 in Fig. 11, but also sufficient survival of the original spaces between such skin forming webs and the inner core of sponge rubber compound, indicated as 84 and 85 in Fig. 8, to successfully give outlet to air and to gases resulting from the heat treatment of the sponge rubber compound thus to prevent such air or gases from becoming trapped and impairing the perfection of the bonding of the rubber covering skin to the sponge rubber core. In this condition all of the rubber materials become vulcanized into permanent shape by equal and uniform application of heat to every portion of the unlimited length of the vulcanized product. The finished product will be released from the mold chambers as are the vulcanized strips illustrated in the aforesaid Patent No. 2,200,262 at the work discharge end of the vulcanizing machine 48. During vulcanizing, the Cellophane ribbons become in no way bonded to the rubber material against which they are pressed and will separate themselves, or are easily stripped off, from the fully vulcanized product as it is freed by the mold sections as indicated near the left end of Fig. 1. In form, the vulcanized product resulting from the shapes of cavity and the kinds of raw materials disclosed in Figs. 6 to 12 will constitute a connected series of easily compressible resilient strip-like bodies having a cellular rubber interior or core 17' completely surfaced by an imperforate, solid, thin, tough rubber skin 44 bonded by vulcanization inseparately at all points to the sponge rubber core. These flexible resilient strip-like bodies are joined by an almost infinitesimally small connecting tissue 78 composed of the vulcanized solid rubber of the skin 44. But this is so minute and delicate that the strip-like bodies are easily separated by severing said tissue along this weak and only line of joindure. Little or no trace of fins is left when the tissues are cut by laterally spaced fixedly stationed razor blades 83 as the vulcanized product is drawn past same as fully described in the above mentioned patent.

The action of the apparatus and materials just described overcomes problems of surface scars which would be likely to result from pockets of trapped gas if the expansion of the sponge rubber compound were alone depended upon to force the skin and its core of compound into remote extremities of cavity pockets such as the lower extremity of the obliquely disposed cavity groove 38. Attention is called to Fig. 10 in this connection which shows that the original cross sectional shape of the strips 17 has been physically distorted before expansion begins and in a manner to force the compound and the material of the lower skin-forming web a good part of the way into its cavity groove before expansion of the compound begins. The expansion therefore is required only to complete the work of filling the cavity by approximately similar degrees of enlargement of the mass in all directions, instead of being required to force particular portions of the mass relatively long distances into the extremity of a deep recess.

It has hereinbefore been intimated that certain of the various steps of the present methods may be eliminated or modified without impairing the usefulness of others of the steps. Also it should be understood that the lower web 14 may be eliminated and only the upper web 13 used or the upper web 13 may be eliminated and only the lower web 14 used, in either of which cases the skin will fail to envelope the sponge rubber core completely and will constitute a mere facing but will be as inseparably bonded to the sponge rubber body as is the completely enveloping skin 44. The strips of sponge rubber compound may be generated other than by extruding, for instance by any of the ways and means for producing and delivering such strips that are disclosed in the U. S. patents hereinbefore referred to. Hence the appended claims are intended to cover all substitutes and equivalents for the particular method steps and apparatus recited which fairly come within their terms.

What is claimed is:

1. The process of converting sponge rubber compound and non-blowable unvulcanized rubber into uniformly vulcanized sponge rubber having at least a partial skin of solid rubber bonded thereto, which includes the steps of, simultaneously withdrawing said compound and plural webs of said unvulcanized rubber from separate sources of supply thereof, progressively sandwiching said compound between said webs, progressively placing one of said webs on the exposed bottom molding wall of an open traveling rigid mold section and placing said compound on said web, and placing the other web on said compound in a manner to cause said compound and webs to travel in unison with said mold, thereafter progressively closing said mold with a rigid closure to form a molding chamber of fixed cross-sectional shape and greater volumetric capacity than the combined volume of compound and webs placed therein and to enclose said compound and webs, and moving the mold and compound and webs through a zone of vulcanizing heat to expand the compound to fill the mold and force the webs respectively against said bottom wall of the traveling mold section and against said rigid closure thereby to vulcanize the compound and webs to bond the latter to the former as an inseparable skin in part conforming to said bottom wall and in part conforming to said rigid closure.

2. The method of producing an unlimited length of a uniformly vulcanized sponge rubber strip covered externally at least partially with a uniformly vulcanized skin of solid rubber bonded thereto, which includes the steps of, simultaneously generating at neighboring stations and continually advancing therefrom in the same general direction a continuous length of uncured sponge rubber compound and at least one web of stretchable uncured non-blowable rubber stock, leading said strip into surface contact with said web at a point near said generating stations, progressively imprisoning said strip and web within a heated traveling mold chamber of fixed cross-sectional size greater than the cross sectional size of said strip and web combined thereby to cause said compound to expand and to cause said web simultaneously to stretch and fill said chamber and simultaneously force said web into conformity with at least a portion of the chamber enclosing mold wall and to vulcanize said strip and web in bonded relationship as they travel in unison.

3. The method of producing unlimited lengths of uniformly vulcanized sponge rubber strips covered with a uniformly vulcanized skin of solid rubber bonded thereto, which includes the steps of, sandwiching one or more traveling strips of sponge rubber compound between traveling upper and lower webs of non-blowable rubber stock, progressively forcing said webs together until they join each other between said strips along one or more lines extending in the direction of travel thereby to cause each of said strips to be completely enveloped by interjoined portions of said webs, progressively imprisoning said strips and interjoined webs within heated traveling mold chambers of greater size than said strips and webs combined thereby to cause said compound to expand and force said enveloping interjoined webs into conformity with the full size and shape of said mold chambers and to vulcanize said strips and webs in bonded relationship as they continue to travel in unison.

4. The process of converting sponge rubber compound and non-blowable unvulcanized rubber into uniformly vulcanized sponge rubber covered externally at least partially with a skin of solid rubber bonded thereto, which includes the steps of, simultaneously withdrawing a continuous strip of said compound and a continuous web of said non-blowable unvulcanized rubber from separate sources of supply at neighboring strip and web generating stations, progressively placing said strip against the top surface of said web at a point near said generating stations in the simultaneous travel of said strip and web away therefrom, progressively placing said web on the exposed bottom molding wall of an open traveling rigid mold section in a manner to cause said compound and web to travel in unison with said mold, thereafter progressively closing said mold with a rigid closure to form a molding chamber of fixed cross-sectional shape and greater volumetric capacity than the combined volume of compound and web placed therein and to enclose said combined compound and web, and moving the mold and compound and web through a zone of vulcanizing heat to expand the compound to fill the mold and force the web of unvulcanized rubber against said bottom wall of the traveling mold section and vulcanize the compound and web to bond the latter to the former as an inseparable skin conforming in contour to said bottom molding wall.

5. The process of converting sponge rubber compound and non-blowable unvulcanized rubber into uniformly vulcanized sponge rubber covered externally at least partially with a skin of solid rubber bonded thereto, which includes the steps of, simultaneously withdrawing a continuous strip of said compound and a continuous web of said non-blowable unvulcanized rubber from separate sources of supply at neighboring strip and web generating stations, progressively placing said web against the top surface of said strip at a point near said generating stations in the simultaneous travel of said web and strip away therefrom, progressively placing said compound on the exposed bottom molding wall of an open traveling rigid mold section in a manner to cause said compound and web to travel in unison with said mold, thereafter progressively closing said mold with a rigid closure to form a molding chamber of fixed cross-sectional shape and greater volumetric capacity than the combined volume of compound and web placed therein and to enclose said combined compound and web, and moving the mold and compound and web through a zone of vulcanizing heat to expand the compound to fill the mold and force the web against said rigid closure and vulcanize the compound and web to bond the latter to the former as an inseparable skin conforming in contour to said rigid closure.

6. Apparatus for converting a strip of sponge rubber compound and a web of unvulcanized rubber into a composite vulcanized strip having a sponge rubber body and a solid rubber facing, embodying in combination, means to produce simultaneously and continually at one generating station a traveling strip of sponge rubber compound having continuous unlimited length, means to convey said strip lengthwise away from said station, means to generate simultaneously at a neighboring station a traveling web of unvulcanized non-blowable rubber stock having continuous unlimited length, a conveyor operative to receive and transport said web away from said neighboring station and in the direction of travel of said strip, means to flex and join said traveling web into wrapper-like conforming contact with said traveling strip at a point in the travel thereof, a continually traveling mold forming a traveling mold chamber, and means progressively and continually to feed said strip and said conforming web together into said mold chamber.

7. The method of vulcanizing a continuous running length of sponge rubber compound in bonded contact with a covering skin of gas impervious rubber, which includes the steps of, progressively feeding a continuous traveling web of gas impervious unvulcanized sheet rubber lengthwise into surface contact with at least one continuous lengthwise traveling strip of sponge rubber compound, imprisoning said web and strip progressively lengthwise while in face-to-face contact within a lengthwise traveling elongated heated chamber, and maintaining freedom of the unvulcanized contacting faces of said sheet and strip to separate slightly all the way backward from the point where said sponge rubber strip ceases to "blow" and begins to vulcanize to the point of initial imprisonment of said sheet and strip within the said traveling chamber thereby to provide an outlet enabling gases to pass backwardly between said web and strip backward to a point of escape to the ambient air.

8. The method of producing unlimited lengths of a uniformly vulcanized sponge rubber strip covered externally at least partially with a uniformly vulcanized skin of solid rubber bonded thereto, which includes the steps of, leading a traveling strip of uncured sponge rubber compound into surface contact with a traveling web of stretchable uncured non-blowable rubber stock, applying progressively to the exterior surface of said traveling strip which contacts with said traveling web a dissipative lubricative substance having the qualities in this respect to zinc stearate to permit unimpaired bonding of said strip to said web, applying to the surface of said web which is opposite its surface contacted by said strip a non-dissipative lubricative substance having the qualities in this respect of powdered mica, and progressively imprisoning said strip and web within a heated traveling mold chamber of greater size than said strip and web combined, thereby to cause said compound to expand and stretch said web sufficiently to fill said chamber and force said web into conformity with a portion of the chamber enclosing mold wall and to cause said strip and web to be vulcanized in bonded relationship as they travel in unison while said powdered mica prevents adhesion of said web to the surface of said heated traveling mold chamber.

9. In a process for converting spaced parallel stretchable webs of non-blowable rubber into a skin for completely enveloping interior bodies of sponge rubber, the steps which include, placing said bodies between said webs, progressively indenting one web toward the other web while said strips are sandwiched therebetween in a manner to cause a furrow in at least one of said webs between said strips thereby to bring a linear extent of one web into relatively closer proximity to the other web, further indenting said linear extent of one web sufficiently to cause it to join with the other web so that the joined webs completely intervene between adjacent strips of compound on opposite sides of said furrow, and holding said webs in contact along their said linear extent while a vulcanizing heat is applied to said webs and strips.

10. The method of producing unlimited lengths of uniformly vulcanized sponge rubber strips covered with a skin of solid vulcanized rubber bonded thereto, which includes the steps of, generating one or more continuous strips of sponge rubber compound at a first station, generating a web of non-blowing vulcanizable rubber at a second station, leading said strips away from said first station toward and past said second station, leading said web away from said second station in a path of travel beneath and paralleling the path of travel of said strips, depositing said traveling strips upon said traveling web and said traveling web upon the upward exposed face of a traveling mold, thereafter progressively roofing over said traveling mold to form a mold chamber larger than the combined volume of said strip and said web, and moving said chamber in unison with its contained web and strip through a zone of vulcanizing heat to expand the compound of said strips and thereby force said web and compound into conformity with the full size and shape of said mold chamber and to vulcanize and bond said web to said compound as an inseparable skin.

11. The method of producing unlimited lengths of uniformly vulcanized sponge rubber strips covered with a skin of solid vulcanized rubber bonded thereto, which includes the steps of, generating one or more continuous strips of sponge rubber compound at a first station, generating a web of non-blowing vulcanizable rubber at a second station, leading said strips away from said first station toward and past said second station, leading said web away from said second station in a path of travel beneath and paralleling the path of travel of said strips, combing said strips to separate and straighten them while traveling, depositing said traveling strips upon said traveling web and said traveling web upon the upward exposed face of a traveling mold, thereafter progressively roofing over said traveling mold to complete a mold chamber larger than the combined volume of said strip and said web, and moving said chamber in unison with its contained web and strip through a zone of vulcanizing heat to expand the compound of said strip and thereby force said web and compound into conformity with the full size and shape of said mold chamber and to vulcanize and bond said web to said compound as an inseparable skin.

12. The method of producing unlimited lengths of uniformly vulcanized sponge rubber strips covered with a skin of solid vulcanized rubber bonded thereto, which includes the steps of, generating one or more continuous strips of sponge rubber compound at a first station, generating separate vertically spaced webs at second and third stations respectively, leading said strips away from said first station toward and past said second and third stations in a path intermediate said vertically spaced webs, leading the lower of said webs away from said second station in a path of travel beneath and paralleling the path of travel of said strips, leading the upper of said webs away from said third station and depositing said upper traveling web upon said traveling strips and depositing the latter upon said traveling lower web and depositing the latter upon the upward exposed face of a traveling mold containing one or more cavities, thereafter progressively roofing over said traveling mold to complete a mold chamber* larger than the combined volume of said strip and said web, and moving said chamber in unison with its contained webs and strip through a zone of vulcanizing heat to expand the compound of said strips and thereby force said webs and compound into conformity with the full size and shape of said mold chamber and to vulcanize and bond said webs to said compound as an inseparable skin completely enveloping said strips.

13. The method of producing unlimited lengths of uniformly vulcanized sponge rubber strips covered with a skin of solid vulcanized rubber bonded thereto, which includes the steps of, generating one or more continuous strips of sponge rubber compound at an extruding station, generating separate vertically spaced webs at calendering stations, leading said strips away from said extruding station toward and past said calendering stations in a path intermediate said vertically spaced webs, leading the lower of said webs away from said calendering station in a path of travel beneath and paralleling the path of travel of said strips, depositing said upper traveling web upon said traveling strips and depositing the latter upon said traveling lower web and depositing the latter upon the upward exposed face of a traveling mold containing one or more cavities, progressively forcing the upper web into close proximity to said lower web along one or more lines lying in the direction of web travel and intermediate said strips, thereafter progressively roofing over said traveling mold cavities with one or more closures in a manner to complete mold chambers respectively larger than the combined volumes of said strips and webs, and moving said chambers in unison with their respectively contained webs and strips through a zone of vulcanizing heat to expand the compound of said strips and thereby force said webs and compound into conformity with the full size and shape of the mold chamber and to vulcanize and bond said webs to said compound as an inseparable skin completely enveloping said strips.

14. The method of producing unlimited lengths of uniformly vulcanized sponge rubber strips covered with a skin of solid vulcanized rubbed bonded thereto, which includes the steps of, generating one or more continuous strips of sponge rubber compound at a first station, generating separate vertically spaced webs at second and third stations respectively, leading said strips away from said first station toward and past said second and third stations in a path intermediate said vertically spaced webs, leading the lower of said webs away from said second station in a path of travel beneath and paralleling the path of travel of said strips, leading the upper of said webs away from said third station and depositing said upper traveling web upon said traveling strips and depositing the latter upon said traveling lower web and depositing the latter upon the upward exposed face of a traveling mold, progressively forcing the upper web relatively near to said lower web along one or more lines lying in the direction of web travel and intermediate said strips, thereafter progressively roofing over said traveling mold to force said upper web into actual contact with said lower web along said lines and to closet mold chambers respectively larger than the combined volumes of said strips and webs, and moving said chambers in unison with their respectively contained webs and strips through a zone of vulcanizing heat to expand the compound of said strips and thereby force said webs and compound into conformity with full size and shape of the mold chamber and to vulcanize and bond said webs to said compound as an inseparable skin completely enveloping said strips.

15. The method of producing unlimited lengths of uniformly vulcanized sponge rubber strips covered with a skin of solid vulcanized rubber bonded thereto, which includes the steps of, generating one or more continuous strips of sponge rubber compound at a first station, generating separate vertically spaced webs at second and third stations respectively, leading said strips away from said first station toward and past said second and third stations in a path intermediate said vertically spaced webs, leading the lower of said webs away from said second station in a path of travel beneath and paralleling the path of travel of said strips, combing said strips to straighten them and to separate them laterally to a definite uniform spacing throughout their lengths, depositing said upper traveling web upon said traveling strips and depositing the latter upon said traveling lower web and depositing the latter upon the upward exposed face of a traveling mold, progressively forcing the upper web into close proximity to said lower web along one or more lines lying in the direction of web travel and intermediate said strips, thereafter progressively roofing over said traveling mold to complete mold chambers respectively larger than the combined volumes of said strips and webs, and moving said chambers in unison with their respectively contained webs and strips through a zone of vulcanizing heat to expand the compound of said strips and thereby force said webs and compound into conformity with full size and shape of the mold chamber and to vulcanize and bond said webs to said compound as an inseparable skin completely enveloping said strips.

16. The method of producing unlimited lengths of uniformly vulcanized sponge rubber strips covered with a skin of solid vulcanized rubber which includes the steps of generating continuous lengths of strips of sponge rubber compound at a first station, generating a web of non-blowing vulcanizable rubber at a second station, leading said strips away from said first station toward and past said second station, leading said web away from said second station in a path of travel above the path of travel of said strips and parallel therewith, progressively depositing said web onto said traveling strips and progressively depositing the latter side by side upon a traveling mold, armoring the top surface of said traveling web by progressively playing off thereupon one or more ribbons of thin, tough, slippery, deformable, paper-like material along one or more lines extending in the direction of web travel laterally intermediate said strips, thereafter progressively roofing over said mold to form closed mold chambers larger than the combined volumes of said strip and web and in a manner to force said web downward toward said mold by progressively pressing downward on said ribbon along one or more of said lines, and moving said chamber in unison with its contained web and strip through a zone of vulcanizing heat to expand the compound to fill the mold chamber therewith and to force the web into surface conformity with the mold chamber.

17. The method of producing unlimited lengths of uniformly vulcanized sponge rubber strips covered with a skin of solid vulcanized rubber bonded thereto, which includes the steps of, generating one or more continuous strips of sponge rubber compound, at a first station, generating separate vertically spaced webs at second and third stations respectively, leading said strips away from said first station toward and past said second and third stations in a path intermediate said vertically spaced webs, leading the lower of said webs away from said second station in a path of travel beneath and paralleling the path of travel of said strips, combing said strips to straighten them and to separate them laterally to a definite uniform spacing throughout their lengths, leading the upper of said webs away from said third station and depositing said upper traveling web upon said traveling strips and depositing the latter upon said traveling lower web and depositing the latter upon the upward exposed face of a traveling mold, armoring the top surface of said traveling upper web by progressively playing off thereupon one or more thin flexible tough ribbons along one or more lines extending in the direction of web travel laterally intermediate said strips, progressively forcing the upper web into close proximity to said lower web along said lines by pressing downward on said ribbons, thereafter progressively roofing over said traveling mold to complete mold chambers respectively larger than the combined volumes of said strips and webs, and moving said chambers in unison with their respectively contained webs and strips through a zone of vulcanizing heat to expand the compound of said strips and thereby force said webs and compound into conformity with the full size and shape of the mold chamber and to vulcanize and bond said webs to said compound as an inseparable skin completely enveloping said strips.

18. The method of producing unlimited lengths of a uniformly vulcanized sponge rubber strip covered externally at least partially with a uniformly vulcanized skin of solid rubber bonded thereto, which includes the steps of, leading a traveling strip of uncured sponge rubber compound into surface contact with a traveling web of stretchable uncured non-blowable rubber stock, progressively imprisoning said strip and web within a heated traveling mold chamber of greater size than said strip and web combined, thereby to cause said compound to expand and stretch said web sufficiently to fill said chamber and force said web into conformity with a portion of the chamber enclosing mold wall and to vulcanize said strip and web in bonded relationship as they travel in unison, coating with a powdered substance the top surface of a flexible belt traveling below and in close proximity to said web, and beating said belt in an upward direction to cause the former to throw off from itself and onto said web a portion of said substance.

19. Apparatus for converting multiple strips of sponge rubber compound and a web of unvulcanized rubber stock into composite vulcanized strips having a sponge rubber body and a solid rubber facing, embodying in combination, means to produce simultaneously and continually multiple strips of sponge rubber compound of continuous unlimited length, an endless traveling belt disposed to convey said strips lengthwise and side by side, means to generate a lower web of unvulcanized rubber stock of continuous unlimited length, a relay belt in series relation to said endless belt disposed to travel under said strips and operative to receive and transport said web in the direction of travel of said strips, traveling mold sections, and means to feed said strips and web simultaneously onto said mold sections with said strips superimposed upon said web.

20. Apparatus for converting multiple strips of sponge rubber compound and a web of unvulcanized rubber stock into composite vulcanized strips having a sponge rubber body and a solid rubber facing, embodying in combination, means to produce simultaneously and continually multiple strips of sponge rubber compound of continuous unlimited length, an endless traveling belt disposed to convey said strips lengthwise and side by side, means to generate an upper web of unvulcanized rubber stock of continuous unlimited length, a relay belt in series relation to said endless belt disposed to travel over said strips and operative to receive and transport said web in the direction of travel of said strips, traveling mold sections forming traveling mold chambers, and means to feed said strips and web simultaneously into said mold chambers with said web superimposed upon said strips.

21. Apparatus for converting multiple strips of sponge rubber compound and multiple webs of unvulcanized rubber stock into composite vulcanized strips having a sponge rubber core enveloped in a solid rubber skin, embodying in combination, means to produce simultaneously and continually multiple strips of sponge rubber compound of continuous unlimited length, an endless traveling belt disposed to convey said strips lengthwise and side by side, means to convey said strips lengthwise and side by side, means to generate a lower web of unvulcanized rubber stock of continuous unlimited length, a relay belt in series relation to said endless belt disposed to travel under said strips and operative to receive and transport said lower web in the direction of travel of said strips, means to generate an upper web of unvulcanized rubber stock of continuous unlimited length, a relay belt in series relation to said endless belt disposed to travel above said strips operative to receive and transport said upper web in the direction of travel of said strips, means progressively to form a continuous furrow in said upper web between laterally adjacent strips until said webs unite between said strips thereby separately to envelope each individual strip, traveling mold sections forming traveling mold chambers, and means to feed said strips into said mold chambers while each strip is completely enveloped by said webs.

LUDOLF H. DE WYK, Jr.